United States Patent [19]

Johnson et al.

[11] 4,030,648
[45] June 21, 1977

[54] CARRIER SUPPORT APPARATUS

[75] Inventors: Melvin Kermit Johnson, Lake Orion; Regis Victor Pilarski, Utica; Jay Walter Jensen, Romeo, all of Mich.

[73] Assignee: The Firestone Tire & Rubber Company, Akron, Ohio

[22] Filed: Sept. 20, 1976

[21] Appl. No.: 724,646

[52] U.S. Cl. .............................. 224/31; 224/32 A; 280/202; 297/243

[51] Int. Cl.² .......................................... B62J 1/28

[58] Field of Search ............ 297/243, DIG. 9, 195; 280/202; 224/32 A, 32 R, 31

[56] References Cited

UNITED STATES PATENTS

| | | | |
|---|---|---|---|
| 1,164,207 | 12/1915 | Pawsat | 297/243 X |
| 2,229,756 | 1/1941 | McCann et al. | 224/32 R |
| 3,879,087 | 4/1975 | Russo | 297/195 |
| 3,902,737 | 9/1975 | Berger et al. | 280/202 |
| 3,970,345 | 7/1976 | Holcomb | 297/243 X |

FOREIGN PATENTS OR APPLICATIONS 457,219  11/1936  United Kingdom ............... 280/202

Primary Examiner—Francis K. Zugel
Attorney, Agent, or Firm—Miller, Morriss and Pappas

[57] ABSTRACT

A carrier support apparatus is provided for attachment to a bicycle frame and connection to auxiliary structures such as baskets, hampers and the like and which comprises a horizontally oriented support rack adapted for mounting on the rear portion of a bicycle frame. The support rack is provided with an integral biased buttress-engaging latch in the forward narrow neck portion thereof, the sides of the rear portion thereof are tapered rearwardly and outwardly so as to form a wide tapered rear support platform. An auxiliary detachable bicycle seat or carrier element is provided which is adapted for selective snap engagement with the support rack. The bottom portion of the bicycle seat or carrier element is provided with a downwardly extending support rack engaging channel portion adapted for selective mating engagement with the tapered portion of the support rack. A downwardly extending buttress element is provided on the bottom portion of the bicycle seat ahead of the channel portion and is adapted to lockably engage the upwardly biased latch provided on the support rack so as to lockably retain the bicycle seat on the support rack with the tapered portion of the support rack in mating locked engagement within the tapered channel portion. Various carrier elements with identical support rack channel structure are useable interchangeably with the seat.

8 Claims, 17 Drawing Figures

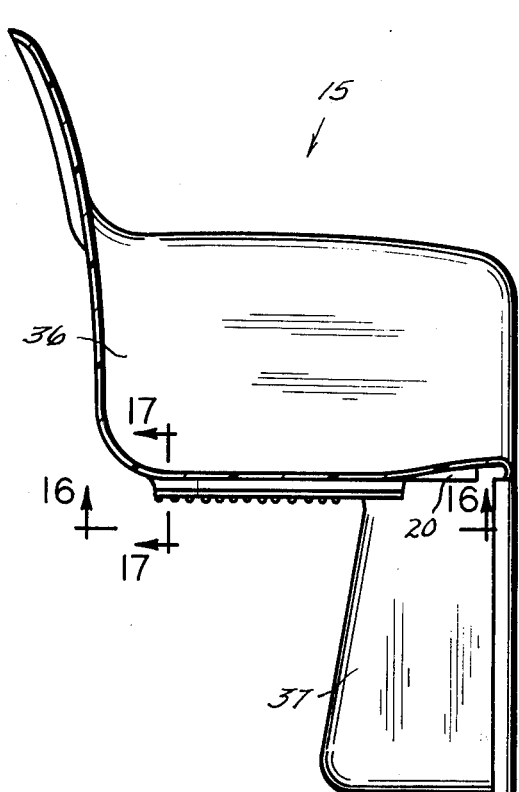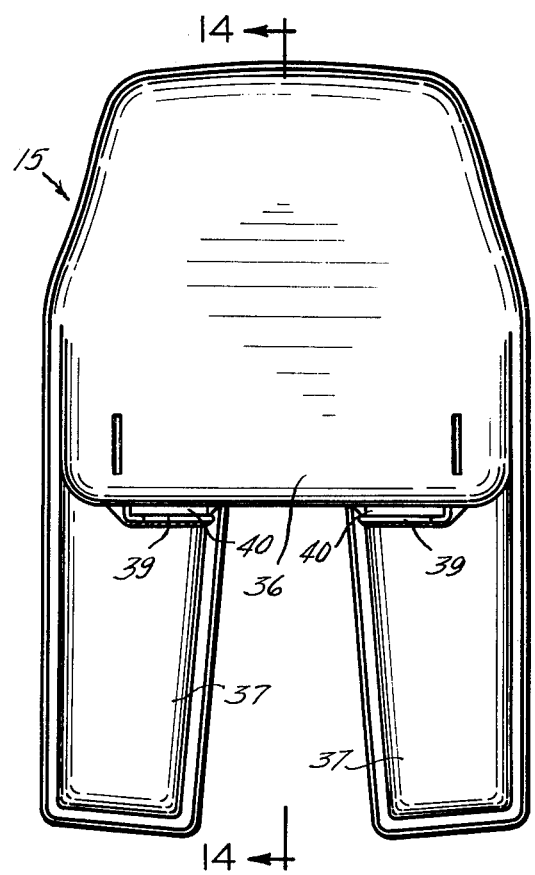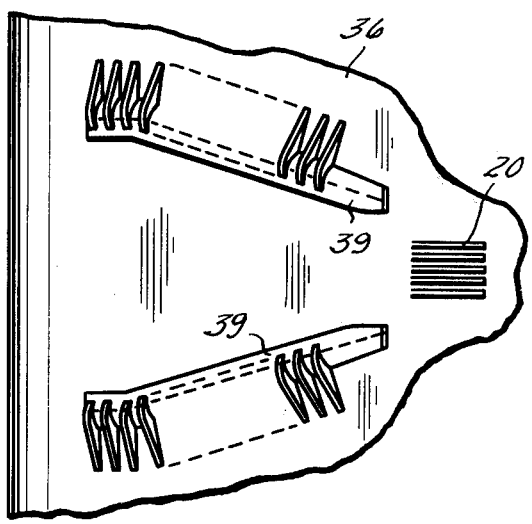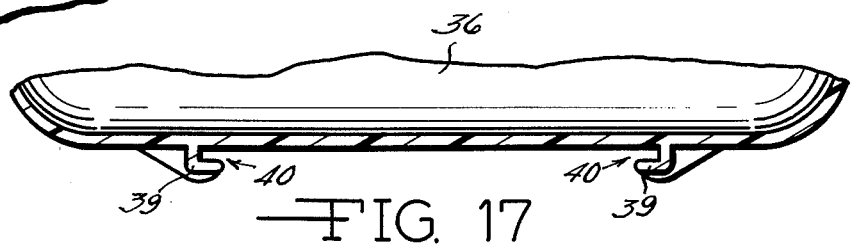

4,030,648

CARRIER SUPPORT APPARATUS

SUMMARY OF THE INVENTION

This invention relates to a carrier element such as a box or bicycle seat and a carrier support apparatus which is provided with a support rack for selective mounting upon a bicycle frame and which is adapted for selective snap lock engagement with the bicycle seat or carrier element positioned thereon. The bottom portion of the bicycle seat or carrier is provided with a rearwardly and outwardly tapered channel portion which is adapted for mating engagement with the corresponding tapered portion of the support rack. A flexible locking latch element is provided on the support rack for selective snap engagement with a buttress element provided on the bicycle seat so as to lockably retain the support rack in mating locked engagement with the channel frame portion of the bicycle seat.

PRIOR ART

The devices of the prior art consist of bicycle seats or carriers which are integrally connected to the support elements which support them upon a bicycle frame. Nowhere in the prior art devices is there shown a bicycle seat such as that of applicants which is adapted to make selective snap locking engagement and disengagement with the support rack upon which it is mounted and which admits of variations and substitutions of the carrier. Representative of the prior art patents involving bicycle seats or carriers are the devices shown in U.S. Pat. No. 3,619,003 to Maurice E. Rich, Jr., Louis F. Whitman U.S. Pat. No. 416,699, Frank M. Stoll U.S. Pat. No. 1,093,741, Thomas V. Cowden U.S. Pat. No. 605,599, Irvin E. Burger et al. U.S. Pat. No. 3,802,598 and Great Britain Pat. No. 457,219.

OBJECTS

An object of this invention is to provide a bicycle seat and carrier support apparatus whereby a bicycle seat or other carrier can make selective snap locking engagement or disengagement with a support rack provided on a bicycle frame.

Another object of this invention is to provide a bicycle seat support rack provided with a flexible biased integral locking latch element adapted to selectively and lockably engage a buttress element provided on a bicycle seat or other carrier element selectively positioned on the support rack.

Another object of this invention is to provide a support rack for bicycle seats or carriers which is attached to a bicycle frame and which is adapted to make selective locked mating engagement with a bicycle seat or carrier positioned thereon.

Yet another object of this invention is to provide a support rack having a tapered support portion which is adapted to matingly and lockably engage a correspondingly tapered channel portion provided on the bottom of a bicycle seat or carrier member.

Other objects and advantages found in the construction of the invention will be apparent from a consideration of the following specification in connection with the appended claims and the accompanying drawings.

IN THE DRAWINGS

FIG. 14 is a side elevational view of the child's bicycle seat.

FIG. 15 is a rear view thereof.

FIG. 16 is a partial bottom view of the auxiliary bicycle seat taken on line 16—16 of FIG. 14 showing the opposed diverging channel portions and buttress member provided on the bottom of the seat.

FIG. 17 is a partial sectional view of the bicycle seat taken on line 17—17 of FIG. 14 showing the opposed channel frame members.

DESCRIPTION

In general an auxiliary bicycle seat and carrier apparatus is provided for use upon a bicycle.

An auxiliary carrier member is provided which can be a child's bicycle seat or a cargo container, as desired. The carrier member is provided with support rack engaging channel means on the bottom thereof. In addition, the carrier member is provided with a downwardly depending buttress element which is positioned in front of the support rack engaging channel means. A support rack is provided which is adapted for selective mounting upon a bicycle frame. The support rack is configured for mating engagement with the channel means provided on the bottom of the carrier member. The support rack is provided with an integral biased flexible latch member which is adapted to make snap engagement with the buttress element so as to lockably retain the carrier member in mating engagement with the support rack upon which it is mounted.

Figure 1:
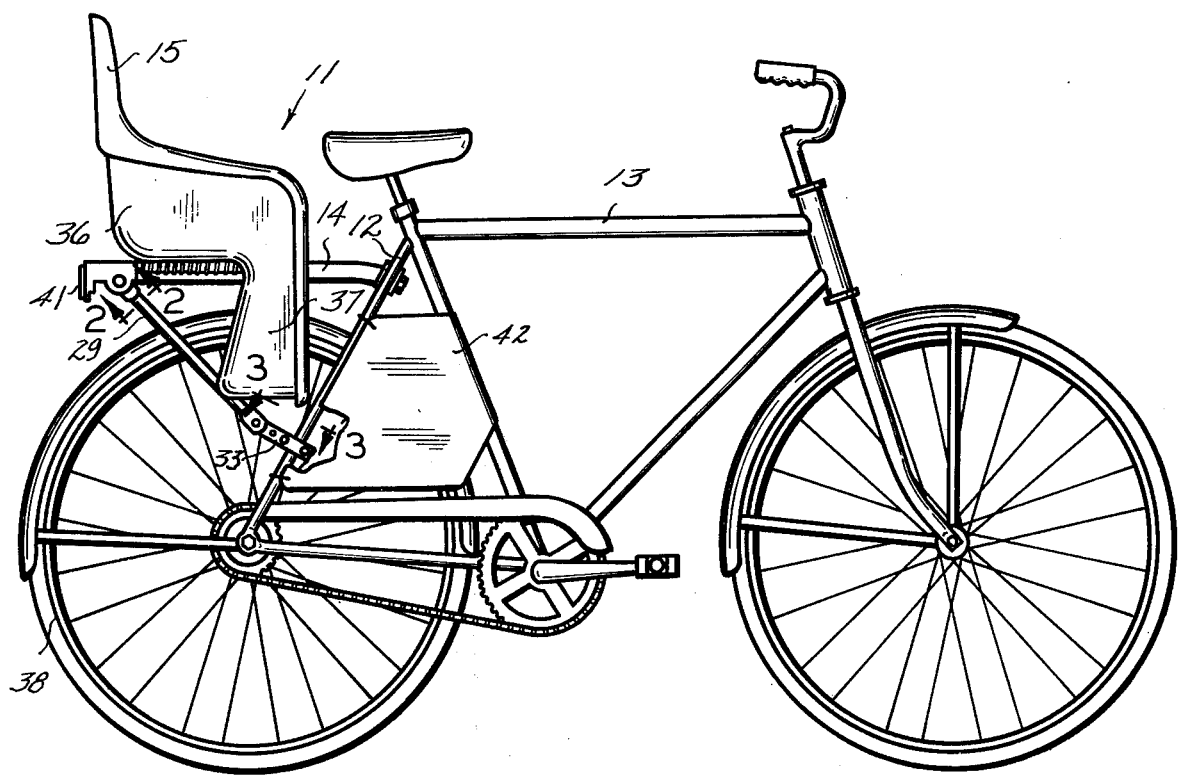
FIG. 1 is a side elevation view of a carrier support apparatus with a child's seat in its operative use position on the bicycle frame.

As shown in FIG. 1 the bicycle seat and carrier element support apparatus 11 is mounted upon the rear struts 12 of the bicycle frame 13. The bicycle seat and carrier support apparatus 11 comprises a support rack 14 and a carrier member 15 selectively positioned thereon. As shown in the drawings, the carrier member 15 consists of a child's seat, but it is within the scope of the invention that it can be a cargo container or the like.

Figure 11:
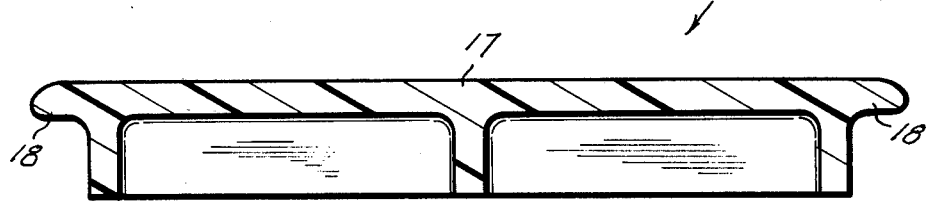
FIG. 11 is a sectional view of the support rack taken on line 11—11 of FIG. 8.
Figure 12:
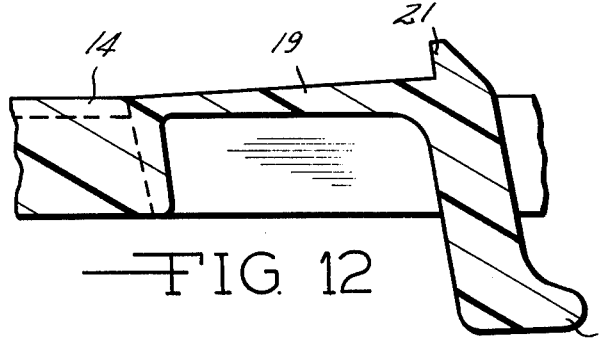
FIG. 12 is a sectional view of the support rack taken on line 12—12 of FIG. 8 and illustrates the flexible latch biased in its normally upward flexed position.
Figure 13:
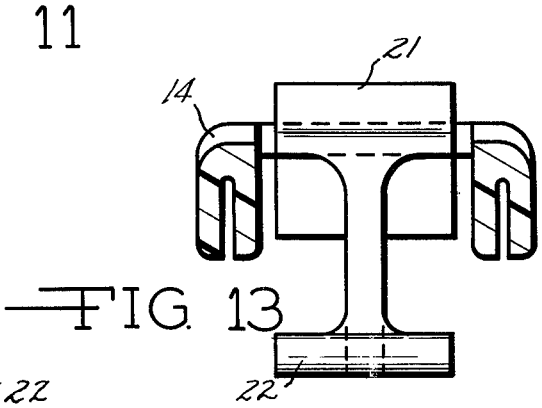
FIG. 13 is a sectional view of the support rack and latch taken on line 13—13 of FIG. 9.

The preferred embodiment of the support rack 14 is fabricated from fiberglass fortified high impact polypropylene material. However, any suitable resin or metal can be utilized to form the support rack 14. As shown generally in the drawings and more specifically in FIGS. 8 and 9, the support rack 14 is provided with a narrow downwardly curved forward portion 16 and outwardly and rearwardly tapered horizontal rear support portion or platform 17. The tapered portion is provided with outwardly extending flanges 18 along each side thereof, as shown in FIG. 11.

Figure 4:
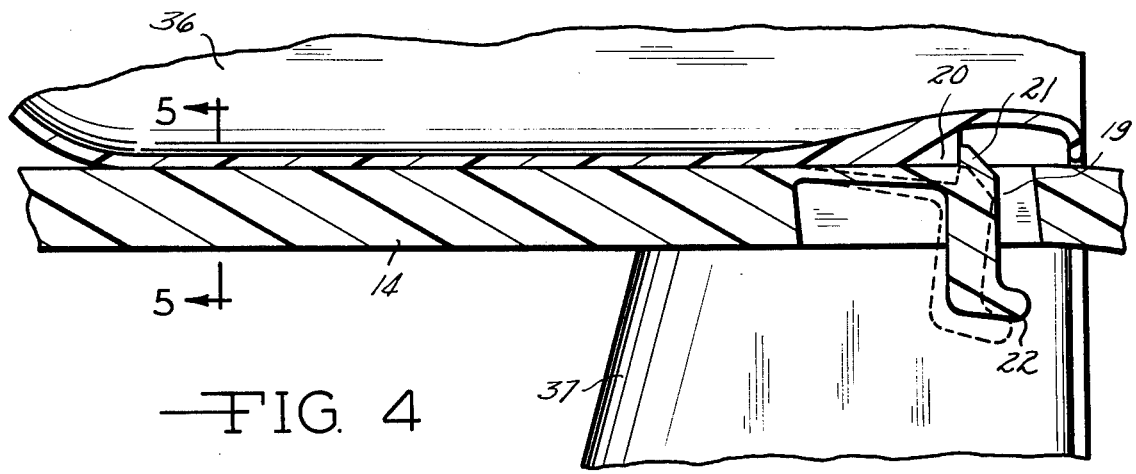
FIG. 4 is a partial cross-sectional view showing the integral flexible fulcrumed latch provided on the support rack in operative snap lock engagement with the buttress provided on the child's bicycle seat mounted on the support rack.

The support rack 14 is provided with an integrally formed flexible latch member 19 which is fulcrumed at one end thereof and which is biased to normally flex upwardly so as to selectively lockably engage a buttress element 20 which is provided on the bottom surface of the seat 15. The free end of the latch 19 is provided with an upwardly extending buttress-engaging ridge portion 21 and a downwardly extending handle portion 22. As shown in the drawings, the latch member 19 is integrally fulcrumed at one end thereof within the opening 23 provided through the support rack 14. Although, as shown, the latch member 19 is fulcrumed or anchored at the rear end of the opening 23, it is within the scope of the invention to reverse the latch member 19 so that it is fulcrumed at the forward end of the opening 23. In either case, the latch member 19 is biased so that the free end thereof is in a normal upwardly flexed position so as to selectively engage the buttress element 20 as shown in FIG. 4.

Figure 6:
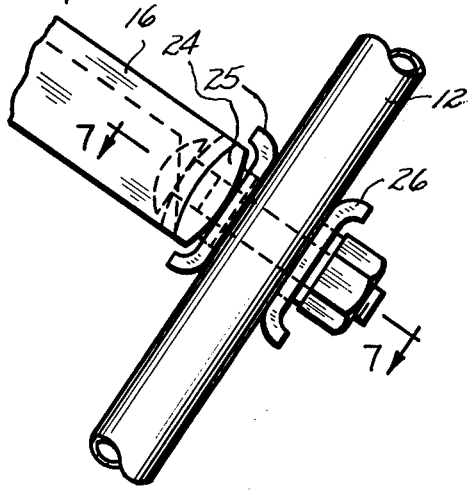
FIG. 6 is a partial view showing the front end of the support rack connected to the bicycle frame by use of the retainer means assembly.
Figure 7:
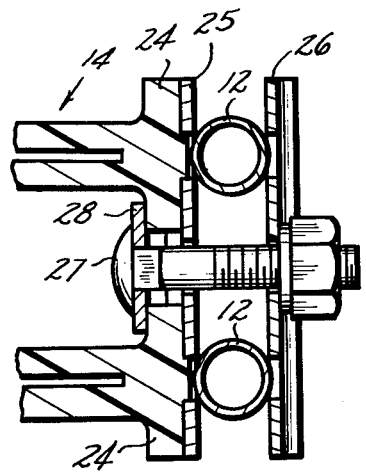
FIG. 7 is a sectional view taken on line 7—7 of FIG. 6 showing the retainer means assembly which fastens the front end of the support rack to the bicycle frame.
Figure 8:
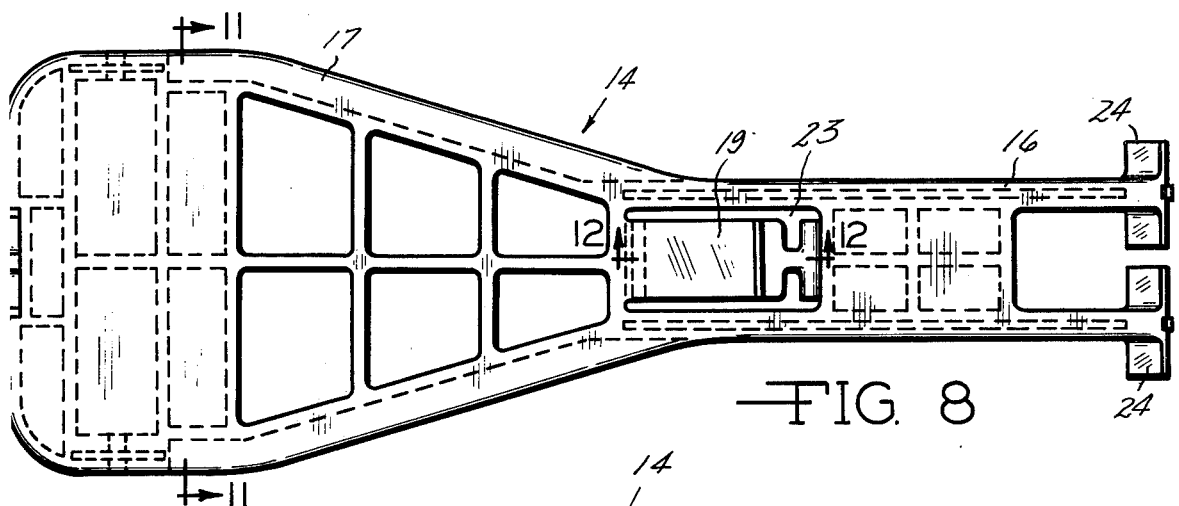
FIG. 8 is a top plan view of the support rack showing the fulcrumed flexible latch element integrally provided thereon.

As shown in FIG. 8, the forward end of the support rack 14 is comprised of a clevis portion which is provided with anchor pads 24. As shown in FIGS. 6 and 7, a pair of transversely positioned support plates 25 and 26 are configured to clampably engage the bicycle frame struts 12 therebetween. The anchor pads 24 are clampably retained against the support plate 25 by means of threaded retainer means 27 and bracket 28. Thus, the retaining assembly as shown in FIGS. 6 and 7 is adapted to clampably attach the forward portion of the support rack 14 to the struts 12 of the bicycle frame 13.

Figure 2:
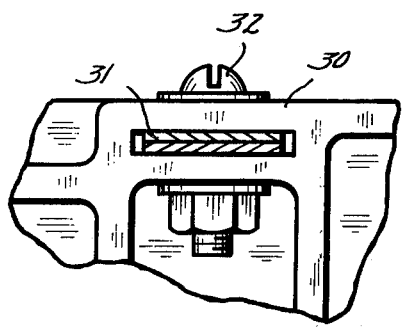
FIG. 2 is a sectional view taken on line 2—2 of FIG. 1 showing one of the support arms connected to the clevis portion of the support rack.
Figure 9:
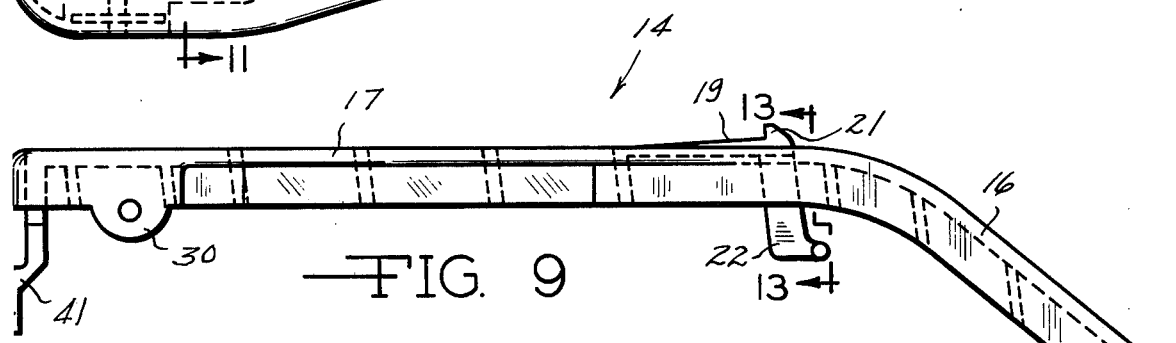
FIG. 9 is a side elevation view thereof.
Figure 10:
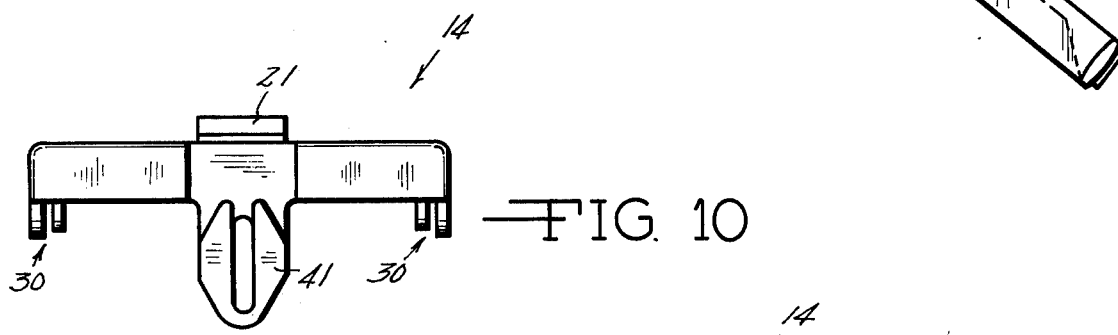
FIG. 10 is a rear elevation view thereof.

The rear portion of the support rack 14 is supported in its horizontal position on the bicycle frame by a pair of support arms 29. As shown in FIGS. 9 and 10, the rear portion of the carrier rack 14 is provided with a pair of downwardly extending spaced-apart clevis portions 30. The clevis portions 30 are adapted to retainably engage the flat portions 31 of the support arms 29 by use of threaded retainer means 32 as shown in FIG. 2.

Figure 3:
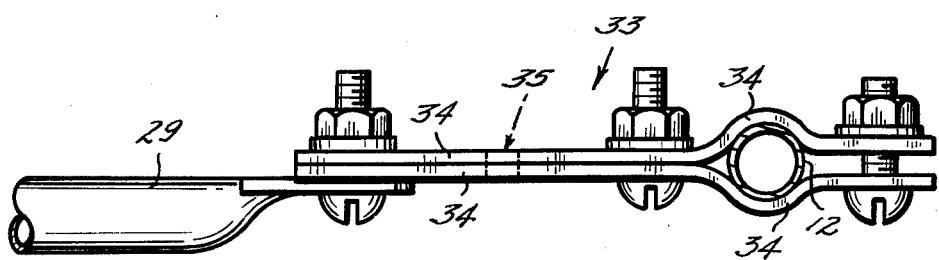
FIG. 3 is a sectional view taken on line 3—3 of FIG. 1 showing the support arm connector bracket connecting the lower end of the support arm to the bicycle frame.

As shown in FIGS. 1 and 3, the lower end of each support arm 29 is attached to the frame strut 12 by use of an adjustable connector bracket assembly 33. The connector bracket assembly 33 is comprised of two connector bracket straps 34 which are connected at one end thereof to the support arm 29 and which are configured at the other ends thereof to clampably engage the frame strut 12 therebetween as shown in FIG. 3. The connector bracket straps 34 are provided with a series of adjustment holes 35 so as to permit adjustable positioning of the support arms 29 on the frame struts 12 so as to maintain the support rack 14 in its horizontal operative use position as shown in FIG. 1.

An integrally molded contoured bicycle seat 15 is provided which is preferably formed from high impact polypropylene resin material. However, it is within the scope of the invention to fabricate the seat 15 from other types of suitable resin materials or from metal or wood as desired.

As will be hereinafter described, the bicycle seat 15 is adapted for selective snap engagement and disengagement with the support rack 14. Although the bicycle seat 15 is utilized in connection with the support rack 14 in the preferred embodiment of the invention, it is considered to be within the scope of the invention to substitute a cargo carrier container box or basket for the bicycle seat 15 as desired.

As shown specifically in FIGS. 14 and 15, the bicylce seat 15 is integrally formed to provide a contoured seat portion 36 and two spaced-apart downwardly extending foot and leg well portions 37. When the bicylce seat 15 is in its locked operative use engagement upon the support rack 14 as shown in FIG. 1, the foot and leg well portions 37 extend downwardly to straddle the rear wheel 38 of the bicycle.

As shown in FIGS. 16 and 17, a pair of spaced-apart L-shaped downwardly extending channel members 39 are provided on the bottom surface of the seat portion 36 of the bicycle seat 15. The spaced-apart channel members 39 are a pair of opposed L-shaped channels which are rearwardly divergent relative to each other so as to form tapered channel openings 40 which are configured to matingly engage the flange portions 18 of the support rack 14. As previously described, the downwardly extending buttress element 20 is positioned forwardly of the channel members 39 and is located on the center line between them. The buttress element 20 is positioned so that the latch element 19 of the support rack 14 makes snap locking engagement therewith when the flange portions 18 of the support rack 14 are in full mating engagement with the channels 39 of the bicycle seat 15. Thus, the bicycle seat 15 is lockably retained in its operative use position upon the support rack 14 without the need for ancillary locking or retaining means.

Figure 5:
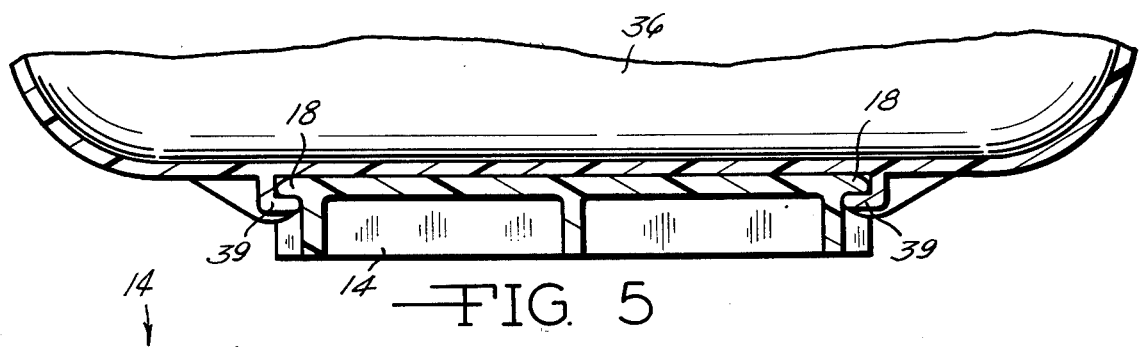
FIG. 5 is a sectional view taken on line 5—5 of FIG. 4 showing the support rack in mating engagement with the correspondingly tapered channel frame provided on the bottom surface of the auxiliary bicycle seat.

In operation, the bicycle seat 15 is selectively installed upon the support rack 14 by sliding the bicycle seat 15 forwardly onto the support rack 14 so that the channel portions 39 of the bicycle seat 15 move into mating engagement with the flanges 18 provided on the tapered portion 17 of the support rack 14. This mating relationship is shown in FIG. 5.

When the bicycle seat 15 is thus moved into its fully installed operative use position on the support rack 14, the latch member 19 moves upwardly to its normal biased position to retainably engage the buttress element 20 as shown in FIG. 4. In this position the latch member 19, the buttress 20 and the channel members 39 co-act to lockably retain the bicycle seat 15 upon the support rack 14 in its operative use position as shown in FIG. 1.

When it is desired to remove the bicycle seat 15 from its operative use position on the support rack 14, the latch member is pulled downwardly by use of handle 22 until it is clear of the buttress element 20 as shown by the dotted lines in FIG. 4. With the latch member 19 pulled downwardly, it is possible to easily remove the bicycle seat 15 forwardly until it slides out of mating engagement with the flanges 18 on the support rack 14. The support rack 14 is provided with a rear extension 41 upon which a reflector can be mounted.

A footguard plate member 42 is provided on the bicycle frame 13 so as to straddle the portion of the rear wheel of the bicycle which is positioned proximate to the legs and feet of the child seated in the bicycle seat 15. The plate member 42 thus protects the child from injury caused by entanglement with the moving wheel 38.

It is thus seen that a unique bicycle seat or carrier support apparatus is provided which permits fast selective snap engagement and disengagement of a child's bicycle seat or carrier with a mating support rack provided on the bicycle frame. Further, the bicycle seat or carrier is safely and lockably secured to the support rack while in its operative use thereon without the need for ancillary bolt and other locking means in association therewith.

Various other modifications of the invention may be made without departing from the principle thereof. Each of the modifications is to be considered as included in the hereinafter appended claims, unless these claims by their language expressly provide otherwise.

We claim:

1. In an auxiliary bicycle seat and carrier support apparatus, the combination comprising:
   a carrier member, said carrier member provided with support rack engaging channel means on the bottom thereof, said carrier member provided with a downwardly depending buttress element in front of said support rack engaging channel means; and
   a support rack adapted for selective mounting upon a bicycle frame, said support rack configured for mating engagement with said channel means, said support rack provided with an integral biased latch member adapted to engage said buttress element so as to lockably retain said carrier member in mating engagment with said support rack.

2. In the apparatus of claim 1 wherein said carrier comprises a child's bicycle seat.

3. In the apparatus of claim 2 wherein said carrier comprises a cargo container.

4. In the apparatus of claim 1 wherein the rear portion of said support rack is rearwardly and outwardly tapered to provide a wide rear support platform, said tapered portion provided with support rack channel-engaging flanges along each side thereof.

5. In the apparatus of claim 4 wherein the support rack engaging channnle means on said carrier member comprise a pair of opposed spaced-apart rearwardly diverging channel members, said channel members adapted for selective mating with said support rack flanges.

6. In the apparatus of claim 1 wherein said latch member is fulcrumed at one end thereof within an opening provided in said support rack, said latch member having a normally upward biased flexed rest position adapted for snap engagement with said buttress element, said latch member provided with a downwardly depending handle portion for downward actuation of said latch member so as to cause disengagement from said buttress element.

7. In the apparatus of claim 1 wherein support rack retaining assembly means are provided to attach the front end of said support rack to the bicycle frame.

8. In the apparatus of claim 1 wherein a pair of support arms are selectively attached at the upper ends thereof to the rear portion of said support rack, said support arms provided with adjustable connector bracket assembly means at the lower ends thereof, said adjustable connector bracket assembly means adapted to selectively engage said bicycle frame so as to support said support rack in a horizontal position upon said bicycle frame.

* * * * *